United States Patent
Aragones et al.

(10) Patent No.: US 8,798,899 B2
(45) Date of Patent: *Aug. 5, 2014

(54) SYSTEM AND METHOD FOR CONTROLLING OPERATION OF AN AIRLINE

(75) Inventors: James Kenneth Aragones, Clifton Park, NY (US); Amy Victoria Aragones, Clifton Park, NY (US); Mark Thomas Harrington, Tewkesbury (GB); Jonathan Mark Dunsdon, Glenville, NY (US)

(73) Assignee: General Electric Company, Schenectady, NY (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/411,991

(22) Filed: Mar. 5, 2012

(65) Prior Publication Data

US 2013/0138333 A1 May 30, 2013

(30) Foreign Application Priority Data

Nov. 24, 2011 (GB) .................................. 1120309.8

(51) Int. Cl.
*G06F 19/00* (2011.01)
*G08G 5/00* (2006.01)

(52) U.S. Cl.
CPC .............. *G08G 5/0043* (2013.01); *G06F 19/00* (2013.01)
USPC .......................................... 701/120; 701/528

(58) Field of Classification Search
USPC ................................ 701/120, 528, 29.7, 31.7
See application file for complete search history.

(56) References Cited

U.S. PATENT DOCUMENTS

| | | | | |
|---|---|---|---|---|
| 6,314,361 | B1* | 11/2001 | Yu et al. | 701/120 |
| 6,397,142 | B1* | 5/2002 | Greenstein | 701/528 |
| 6,951,008 | B2 | 9/2005 | Quaile | |
| 7,209,814 | B2* | 4/2007 | Kipersztok et al. | 701/31.6 |
| 2003/0167110 | A1* | 9/2003 | Smith et al. | 701/3 |
| 2003/0191678 | A1* | 10/2003 | Shetty et al. | 705/8 |
| 2004/0163011 | A1* | 8/2004 | Shaw | 714/25 |
| 2007/0203762 | A1* | 8/2007 | Cutler et al. | 705/5 |
| 2008/0010107 | A1* | 1/2008 | Small et al. | 705/9 |

* cited by examiner

*Primary Examiner* — Helal A Algahaim
*Assistant Examiner* — Dale W Hilgendorf
(74) *Attorney, Agent, or Firm* — McGarry Bair PC

(57) ABSTRACT

An airline operations control system for an airline having multiple aircraft and multiple routes formed by one or more flights where the airline operations control system includes a computer searchable database a query module configured to query the database and a display module and a method of controlling operation of the airline having the multiple aircraft and the multiple routes.

19 Claims, 4 Drawing Sheets

SYSTEM AND METHOD FOR CONTROLLING OPERATION OF AN AIRLINE

CROSS-REFERENCE TO RELATED APPLICATIONS

This application claims priority under 35 U.S.C. §119 to British Patent Application No. 11203098, filed Nov. 24, 2011, the disclosure of which is incorporated herein by reference.

BACKGROUND OF THE INVENTION

Operators in an Airline Operations Center (AOC) of a major airline manage the execution of thousands of flights a day and adjust in real time the movements of the aircraft and crewmembers of the airline to minimize costly delays and cancellations, while complying with complex maintenance and routing constraints. These operators are responsible for preparing flight plans, adjusting the airline schedule including but not limited to flight schedule, departure slot assignments, aircraft assignments and crew assignments in response to various factors such as thunderstorms and equipment failures. A challenge for major airlines is to limit inefficiency in the airline and manage information efficiently to alleviate the impact of unforeseen schedule disruptions. The future ramifications of an aircraft failure on related and unrelated flights or routes is very complex, especially future ramifications that may impact multiple routes after one or more legs of the route are executed. The AOC is a very busy environment and where decisions must be made quickly. The combination of the complex ramifications and the short time frame in which to make decisions in response to an aircraft failure makes it practically impossible for aircraft operations personnel to understand the full downstream impacts of a decision. The decisions made by the aircraft operations personnel may have great operational and economic impacts on the airline.

BRIEF DESCRIPTION OF THE INVENTION

In one embodiment, an airline operations control system for an airline having multiple aircraft and multiple routes formed by one or more flights, which are implemented by the aircraft flying the flights forming the routes, includes a computer searchable database, a query module configured to query the database for and output stable operating solutions that ensure completion of the multiple routes based on at least one failure of at least one aircraft flying one of the routes, wherein the query module is executed on a computer configured to access the database, and a display module configured to display at least a subset of the stable solutions to an aircraft operations personnel for use in determining a response to the failure.

In another embodiment, a method of controlling operation of an airline having multiple aircraft and multiple routes includes providing a computer searchable database, determining a failure in one of the aircraft designated for a flight, determining stable solutions of operation of the airline by permutating over the database an airline operation algorithm that simulates execution of each of the multiple routes to completion and varying for each permutation at least one of a group of inputs: repairing the failure now, delaying the repair, delaying the flight, canceling the flight, and swapping the aircraft with the failure for another aircraft, and displaying at least a subset of the stable solutions to an aircraft operations personnel for use in determining a response to the failure.

DESCRIPTION OF EMBODIMENTS OF THE INVENTION

Figure 1:
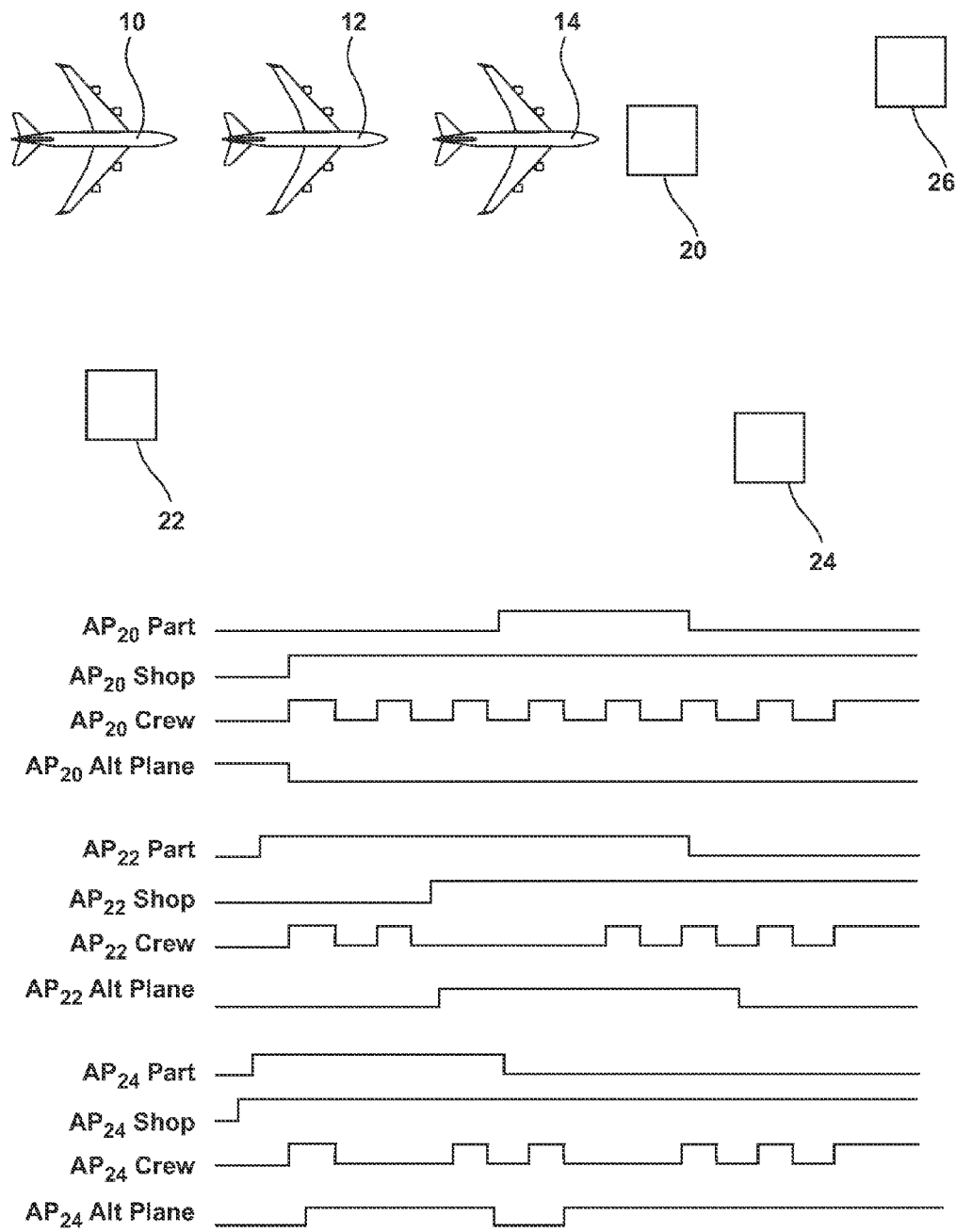
FIG. 1 is a schematic view of an airline and information that may be used in a method of controlling operation of the airline according to an embodiment of the invention.

An initial explanation of an airline environment and the problems faced when aircraft operations personnel make decisions will provide useful. As airlines have hundreds of aircraft and thousands of crewmembers within their purview and take into consideration a wide variety of information it will be understood that FIG. 1 only schematically illustrates a very simplified version of an airline and the information which may be taken into consideration. However, for simplicity of explanation, the airline of FIG. 1 is useful to explain the inventive concepts without undue complexity. More specifically, an airline having three aircraft 10, 12, and 14, which are currently located at a first airport 20 and may fly to either a second airport 22 or a third airport 24 and an AOC 26 are illustrated. While the aircraft 10, 12, and 14 are illustrated as being identical it will be appreciated that the aircraft 10, 12, and 14 may be different makes and models, with differing functionality and capacity, and thus may not necessarily be swapped with each other. As aircraft have planned routes, we will assume in our explanation that aircraft 10 is supposed to fly from airport 20 to airport 24 and then to airport 22, aircraft 12 is supposed to fly from airport 20 to airport 24 and back to airport 20, and aircraft 14 is supposed to fly to airport 24.

For purposes of simplicity in this explanation the aircraft operations personnel at the AOC 26 may only look at the availability of a part to fix a fault in the aircraft, the availability of a shop at the corresponding airport to fix the aircraft, the availability of a crew to fly the aircraft, and the availability of an alternative plane to be swapped with the faulty aircraft. For example, these considerations are shown for each of the airports 20, 22, and 24 at the bottom of FIG. 1. The availability of each is shown to change with time as it will be understood that the various resources may not always be available at each of the airports 20, 22, and 24. In fact, some airports may be unable to handle certain faults at all. By way of non-limiting example, a particular airport may not have a high enough lift to work on a tail section of a large aircraft and thus may be unable to handle a fault with the tail section.

For purposes of this explanation it may be understood that all the aircraft 10, 12, and 14 are at airport 20 at the same time and that aircraft 10 will be the first to leave the airport 20 and that flights on aircraft 12 and 14 are not scheduled to leave until several hours later. Before it leaves, aircraft 10 may have a fault occur with no warning that essentially disables the aircraft 10. At this point, if there were no other aircraft, the aircraft operations personnel of the AOC 26 may have very limited options to either delay the flight and fix the problem at airport 20 assuming the availability of the part and the shop or cancel the flight, which may result in large costs to the airline. However, because aircraft 12 and 14 are not scheduled to leave for several hours the operator of the AOC 26 may choose to simply swap aircraft 14 for aircraft 10 and attempt to fix aircraft 10 before the flight originally scheduled for aircraft 14 is supposed to leave. Such a swap may only be an option if the aircraft 14 and the aircraft 10 are similar in size and may accommodate the same number of passengers.

In an alternative example, it may be assumed that aircraft 10 did not have the fault occur with no warning. Instead, information from a health management system of the aircraft 14 indicated that a fault will occur with the aircraft 14 within the next 12 flight hours. At this point, the aircraft operations personnel of the AOC 26 may have expanded options as compared to the first scenario. If alternative aircraft are available and may be swapped with aircraft 14 without delaying any flights then swapping is of course an option. However, if there are no aircraft available to swap with or a part is not available at airport 20 or 24 the two airports that the aircraft 14 is scheduled to be at within the next 12 flight hours the aircraft operations personnel may have to make other decisions. Of course delaying the flight and fixing the problem at airport 20 assuming the availability of the part and the shop or canceling the flight are options; however, delays and cancelations may both be more costly options. One solution may be to have both aircraft 10 and 14 complete their flights to airport 24 and then for aircraft 14 to continue the remainder of the route for aircraft 10 to airport 22 where the part is located. While this may seem like a simple fix in a more complex airline scenario such a change may have unforeseen impacts on the airline.

For example, if aircraft 10 was originally scheduled to fly to an additional airport immediately after landing at airport 22 the fact that the aircraft 14 now needs to be repaired before making any more flights may not be realized by the aircraft operations personnel at the time of the decision to swap the flights at airport 24. Or perhaps the flights are swapped but in the meantime a problem occurs with one of the other aircraft and that aircraft is now taking up the available resource of the shop at airport 22. Or perhaps the delay in fixing the aircraft 14 means a flight crew is no longer available. It will quickly be realized that with an actual airline having thousands of flights, hundreds of aircraft, and varying resources at each airport and with a variety of decisions that the aircraft operations personnel may make at any one time, a single decision that seems like the best solution for the problem at the time may end up causing multiple flight cancelations later in the day and that this result could have been avoided had the various options and consequences been fully realized and considered.

Figure 2:
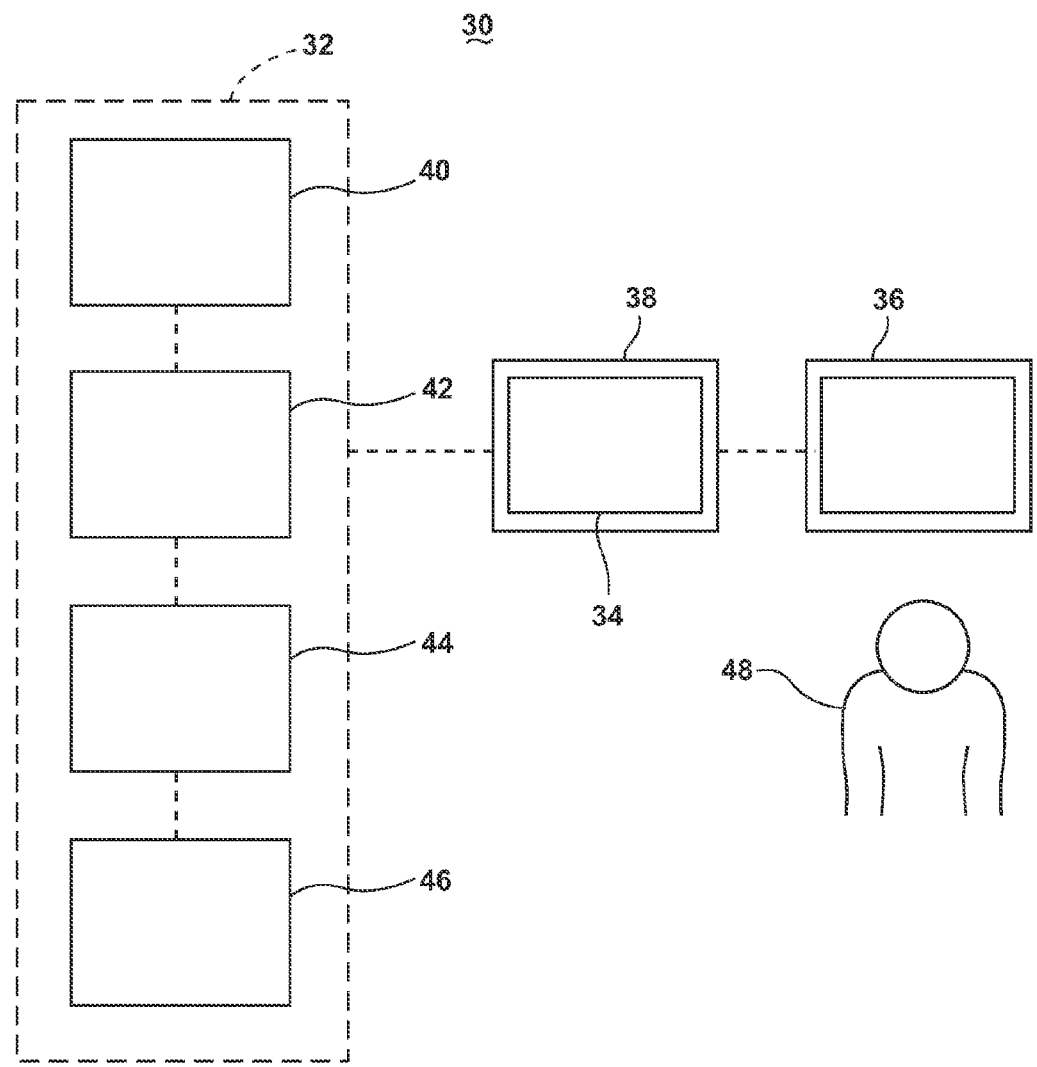
FIG. 2 is a schematic view of an airline operations control system according to another embodiment of the invention.

The embodiments of the invention provide a system and method for determining and displaying to aircraft operations personnel stable solutions when such failures occur or are predicted to occur. FIG. 2 schematically illustrates an airline operations control system 30 for an airline and includes a computer searchable database 32, a query module 34, and a display module 36. It will be understood that the computer searchable database 32 may be any suitable database, including a single database having multiple sets of data, multiple discrete databases linked together, or even a simple table of data. Regardless of the type of database the computer searchable database 32 may be provided on storage medium on a computer (not shown) or may be provided on a computer readable medium, such as a database server. It is contemplated that the computer searchable database 32 may include information relevant to determining stable solutions of operation of the airline. By way of non-limiting example, such computer searchable database 32 may include among other information aircraft inventory data 40, aircraft status data 42, route data 44, and maintenance resources data 46.

The aircraft inventory data 40 may include a unique identifier for each of the multiple aircraft in the airline. Aircraft status data 42 may include a maintenance schedule, for each of the multiple aircraft in the aircraft inventory data 40. Aircraft status data 42 may also include how healthy each aircraft in the aircraft inventory data 40 is or what failures have occurred in the aircraft or what artificial failures may occur in the aircraft. The failure information available may include what type of failure and if the aircraft is now grounded until fixed, has a time-limited dispatch for which the aircraft may operate before it needs to be fixed, or has a limited dispatch by which the aircraft has restrictions on the flight of the aircraft before it is fixed. In this manner, the aircraft status data 42 for any given aircraft in the aircraft inventory data 40 may indicate that the aircraft is at least one of: fully healthy, grounded, time-limited dispatch, and limited dispatch. Route data 44 may include each flight on a route, a source and destination for each flight, and the aircraft designated to fly each flight. Route data 44 may also include operational requirements and priorities of the airline including through passengers, load factors, costs, etc. Maintenance resources data 46 may include maintenance resources for each of the destinations including equipment, parts, slots available, and availability of maintenance crews. It is also contemplated that maintenance resource data 46 may include data with respect to traveling maintenance resources. Such traveling maintenance resources may be moved between destinations and may include among other things, maintenance crews, portable equipment, and parts that may be shipped to a destination.

It is contemplated that the computer searchable database 32 may include additional data or information to aid in the determination of stable solutions of operation of the airline. By way of non-limiting example, aircraft often have a five or six hour night stop during any given three day window and such information may be included in the database 32. In this manner it is contemplated that the computer searchable database 32 includes information for various extended time period. By way of additional non-limiting example, additional information that may be included in the computer searchable database 32 may include prognostic aircraft health data, which may indicate potential failures in the aircraft of the airline. More specifically, the aircraft may include a health management system or have similar capabilities and such information may be offloaded from the aircraft to the computer searchable database 32 and may be used to predict failures in the aircraft.

The query module 34 may be executed on a computer 38 configured to access or query the computer searchable database 32 for and output stable operating solutions that ensure completion of the multiple routes based on at least one failure of at least one aircraft flying one of the routes. It will be understood that the query module 34 may access the computer searchable database 32 via a communication network or computer network coupling the query module 34 to the computer searchable database 32. By way of non-limiting example, such a computer network may be a local area network or a larger network such as the internet. It is contemplated that the query module 34 may make repeated queries of the computer searchable database 32. By way of non-limiting example, the query module 34 may determine the stable solutions by permutating over the computer searchable database 32 an airline operation algorithm that simulates the execution of each of the multiple routes to completion and varying for each permutation at least one of a group of inputs. Such inputs may include repairing the failure now, delaying the repair, operating the aircraft with restrictions, delaying the flight, canceling the flight, and swapping the aircraft with the failure for another aircraft. The query module 34 may be capable of estimating costs for each activity type and permutation. Such costs may relate to a cost associated with the number of cancellations, the number of swaps, the number of minutes delayed, the time that an aircraft is out of service, and the number of out of service events. The query module 34 may include such cost estimations in evaluating what stable operating solutions to output. For example, the query module 34 may be designed to only output a subset of the stable operating solutions based on the efficiency of the solutions and/or the cost of the solutions. In this manner the query module 34 may simulate the operation of the airline and output stable operating solutions based upon efficiency and/or cost.

In this manner, the query module 34 may use an artificial intelligence methodology for making decisions related to what solutions are stable and what stable solutions should be output based on evidential reasoning. The general details of how computerized systems may evidentially reason are known in the art, which include the disclosure in U.S. Pat. No. 6,951,008, issued Sep. 27, 2005, entitled Evidential Reasoning System and Method, which is incorporated herein by reference. Therefore, the general details of the query module 34 will not be fully described in this application and it will be recognized that the output of stable solutions or a subset thereof may be determined bases on such evidential reasoning.

The display module 36 may be configured to display at least a subset of the stable solutions to an operator or aircraft operations personnel 48 for use in determining a response to the failure or predicted failure. The display module 36 may also display potential consequences of such stable solutions. Although the query module 34 and display module 36 have been illustrated separately, it is contemplated that they may be included in a single device. The display module 36 may be capable of not only displaying such information but may also be capable of receiving input from the aircraft operations personnel 48 and such input may be provided to the query module 34 and the inputs may be used by the query module 34 in its determination of stable operating solutions to be displayed on the display module 36.

During operation, the airline operations control system 30 may determine a failure in one of the aircraft designated for a flight, and may display at least a subset of the stable solutions to aircraft operations personnel 48 for use in determining a response to the failure. Determining a failure may include at least one of an actual failure or an artificial failure. When the database includes prognostic aircraft health data, the artificial failure may be provided from the prognostic health data.

Initially, the query module 34 may first determine a current health state for each aircraft. In the case where the computer searchable database 32 includes prognostic aircraft health data, the query module 34 may also determine a future health state for each aircraft. The query module 34 may then use that information in a simulation of the airline. When a failure is determined the query module 34 may determine stable solutions of operation of the airline by permutating over the computer searchable database 32 an airline operation algorithm that simulates execution of each of the multiple routes to completion.

The airline operation algorithm may be permutated in a variety of ways to determine such stable solutions. For example, for each permutation at least one of a group of inputs: repairing the failure now, delaying the repair, operating the aircraft with limitations, delaying the flight, canceling the flight, and swapping the aircraft with the failure for another aircraft. For example, when the aircraft status data 44 includes the aircraft being grounded, delaying the repair is removed as a variable input to the airline operation algorithm. By way of additional example, when the aircraft status data 44 includes time-limited dispatch, delaying the repair is maintained as a variable input to the airline operation algorithm until the time limit is met. In the event that the computer searchable database 32 includes prognostic aircraft health data, the airline operation algorithm may incorporate prognostic failures in other aircraft as well. Thus, the stable solutions may take into consideration the failure of other aircraft within the simulation. With prognostic data included determining stable solutions may take into consideration failure frequency, the ability to detect certain failures, and the ability to prevent failures that may result in costly delays or cancelations.

Regardless of whether the airline operations control system 30 includes prognostic data, it is contemplated that the query module 34 may include cost factors and may determine the best, including required stability, solutions and may output those stable solutions to the display module 36 where the aircraft operations personnel 48 may then make an appropriate decision based on the displayed stable solutions. The aircraft operations personnel 48 may then implement one of the recommended stable solutions. It is contemplated that such stable solutions may be automatically linked to the airlines enterprise systems and once approved by the aircraft operations personnel 48 be directly implemented.

It is contemplated that the query module 34 may rank the stable solutions based on at least one of airline personnel preference and cost and that the query module 34 may output to the display module 36 a subset of the stable solutions based on the ranking. It is contemplated that the subset of displayed solutions may be selected based on at least one of the following constraints: cost including lowest cost, no canceled flights, reliability, customer satisfaction, and that all passengers reach their destination on the day planned. The cost including the lowest cost may be determined based on at least one of a predetermined value for cost per minute of delay, cost per cancellation, cost per minute that an aircraft is out of service, and cost per swap. The determination of the lowest cost may also consider costs for compensation vouchers, fuel, maintenance, labor, etc. The no canceled flights constraint or all passengers reaching their destination on the day planned constraint may be limited to holidays such as Thanksgiving and Christmas and the day before the holiday. It is contemplated that no canceled flights may be one way to ensure that all passengers reach their destination on the day planned; however there may be other alternatives to accomplish this. It is contemplated that these costs may be tunable by the airline and by circumstance including before a holiday when getting everyone to their destination is important. Thus it is contemplated that the that the query module 34 may rank the stable solutions based on passenger satisfaction including minimizing cancellations, minimizing rerouting, minimizing arrival delays, maximizing passengers arriving on-time, maximizing passengers arriving the same-day as scheduled, etc. By way of non-limiting examples, customer satisfaction may be determined based on the fewest cancelled flights, fewest passengers not arriving at their final destination on the day planned, fewest passengers delayed more than 15 minutes, lowest total flight delays, lowest total passenger delays, and post-flight customer satisfaction surveys.

A technical effect is that the operational efficiency of the airline may improve through use of the airline operations control system 30 because the airline operations personnel is presented with at least a subset of stable solutions upon a determined failure in one of the aircraft designated for a flight, which may take into account a combination of all data and simulates the airline to understand the options and accurately costs these to generate the stable solutions. In this manner, the airline operations control system 30 may include elements of prediction of impending failure, modeling and simulation of the airline, analysis of the options available to the airline, costs analysis of these options and optimization of these options to result in a recommended action to the airline operations center. Prediction of the state of the aircraft results in early detection and prediction of faults which in turn allows for more options for the airline before they need to respond.

Figure 3:
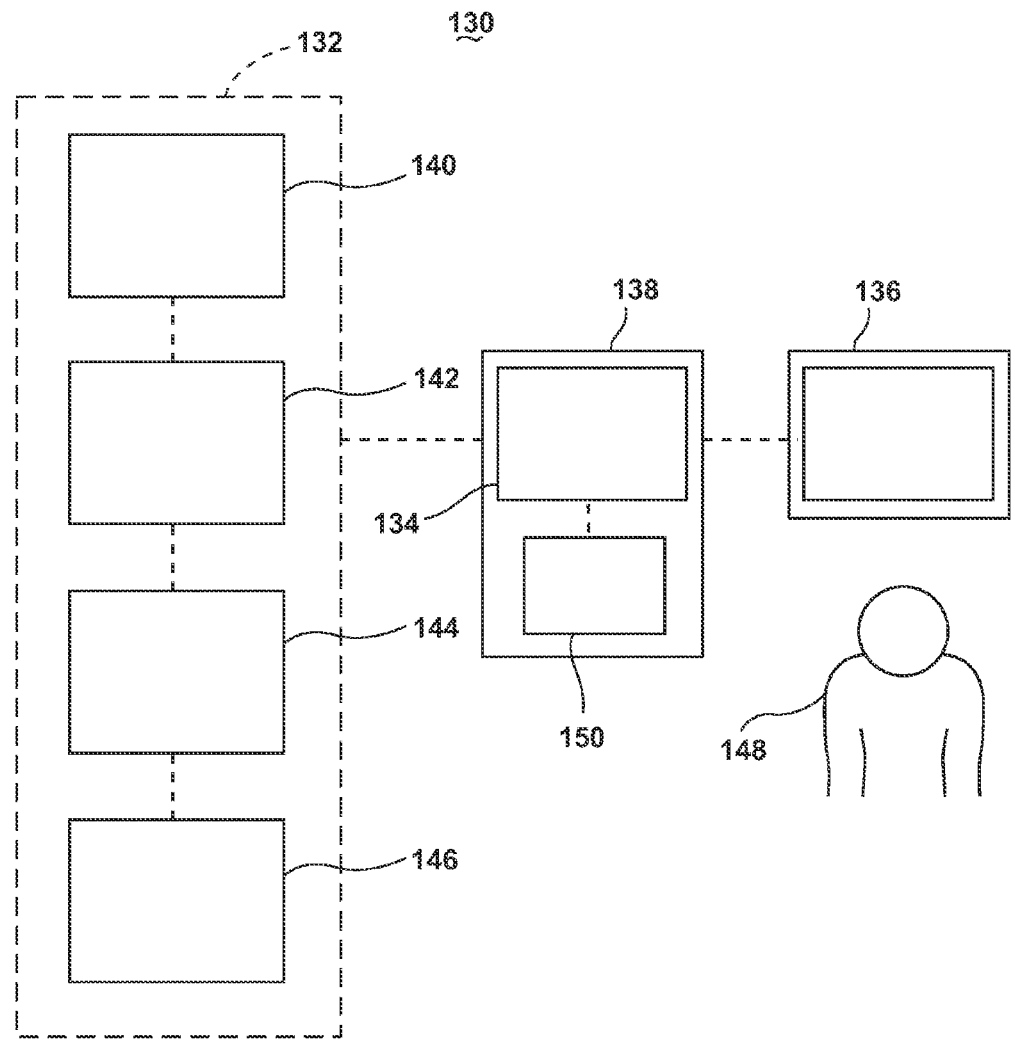
FIG. 3 is a schematic view of an airline operations control system according to another embodiment of the invention.

FIG. 3 illustrates an alternative airline operations control system 130 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted.

A difference between the first embodiment and the second embodiment is that the query module 134 of the airline operations control system 130 includes at least one input. The at least one input to the query module 130 may include at least one of the following: immediately repair the failure, delay the repair, delay the flight, cancel the flight, and swap the aircraft. A prognostic module 150 is also included in the airline operations control system 130 and is operably coupled to the query module 134.

The second embodiment of the airline operations control system 130 may operate similarly to the first embodiment described above in that it may provide a subset of stable solutions to aircraft operations personnel 148 for use in determining a response to a failure. As with the first embodiment the at least one failure may be an actual failure or an artificial failure. The artificial failure may be selected from prognostic aircraft health data contained in the computer searchable database 132. However, it is contemplated that during operation, the airline operations control system 130 may pre-compute stable solutions instead of trying to provide stable solutions of a large complex simulation at the time of a failure. In this manner, the operations control system 130 may rapidly provide stable operating solutions and such speed may improve technical performance of the operations control system 130 and user acceptance of the stable operating solutions. It is contemplated that the query module 134 may include cost factors and may determine the best, including required stability, solutions and upon the occurrence of a failure may output those stable solutions to the display module 136 where the aircraft operations personnel 148 may then make an appropriate decision based on the displayed stable solutions. The aircraft operations personnel 148 may then implement one of the recommended stable solutions.

During operation, it is contemplated that during operation that the prognostic module 150 may continuously execute the query module 134 while varying at least one input to the query module 134. In this manner, the prognostic module 150 may generate "what if" scenarios for the operation of the airline. It is contemplated that during operation the query module 134 may iterate over the computer searchable database 132 for all permutations of the at least one input variable.

It is also contemplated that the prognostic module 150 may execute a separate query module (not shown) for each of the aircraft to form a dedicated thread for each aircraft and generate a variety of "what if" scenarios for each aircraft. In this manner, the operations control system 130 may examine available options should the aircraft suffer a failure. Such an approach may provide useful as it is highly unlikely that two aircraft would suffer failures at exactly the same moment and as soon as one event has occurred and a course of action has been selected by the aircraft operations personnel 148 all other simulations could be immediately updated.

Regardless of whether the prognostic module 150 executes separate query modules for each aircraft, the prognostic module 150 may continuously run so that a subset of available options is known rather than waiting for a failure to occur. This ensures that when a failure does occur a subset of options is already available for presentation to the aircraft operations personnel 148, or at worst the total search space for the analysis is drastically reduced as many options will have been rejected by the pre-computation.

A technical effect is that the operations control system 130 will be capable of pre-computing recommendations available for any given scenario and will be capable of providing rapid results to the operator upon a failure occurring. The prognostic module 150 may allow continuous modeling of the options available and costs analysis of these options. This pre-computation reduces the computational load at the moment a failure occurs and removes the delay in calculating a recommended action and allow for even greater operational efficiency of the airline. The operations control system 130 allows for rapid results without the need for more computational resources and results in a system that is capable of providing rapid results with a reduced cost. That the operations control system 130 provides such a rapid result may also results in greater user acceptance of the recommended solutions by the aircraft operations personnel 148. It is contemplated that the aircraft operations personnel 148 may also be able to see the "what if" scenarios on the display module 136 or other device and that this may also help with greater user acceptance by the aircraft operations personnel 148.

Figure 4:
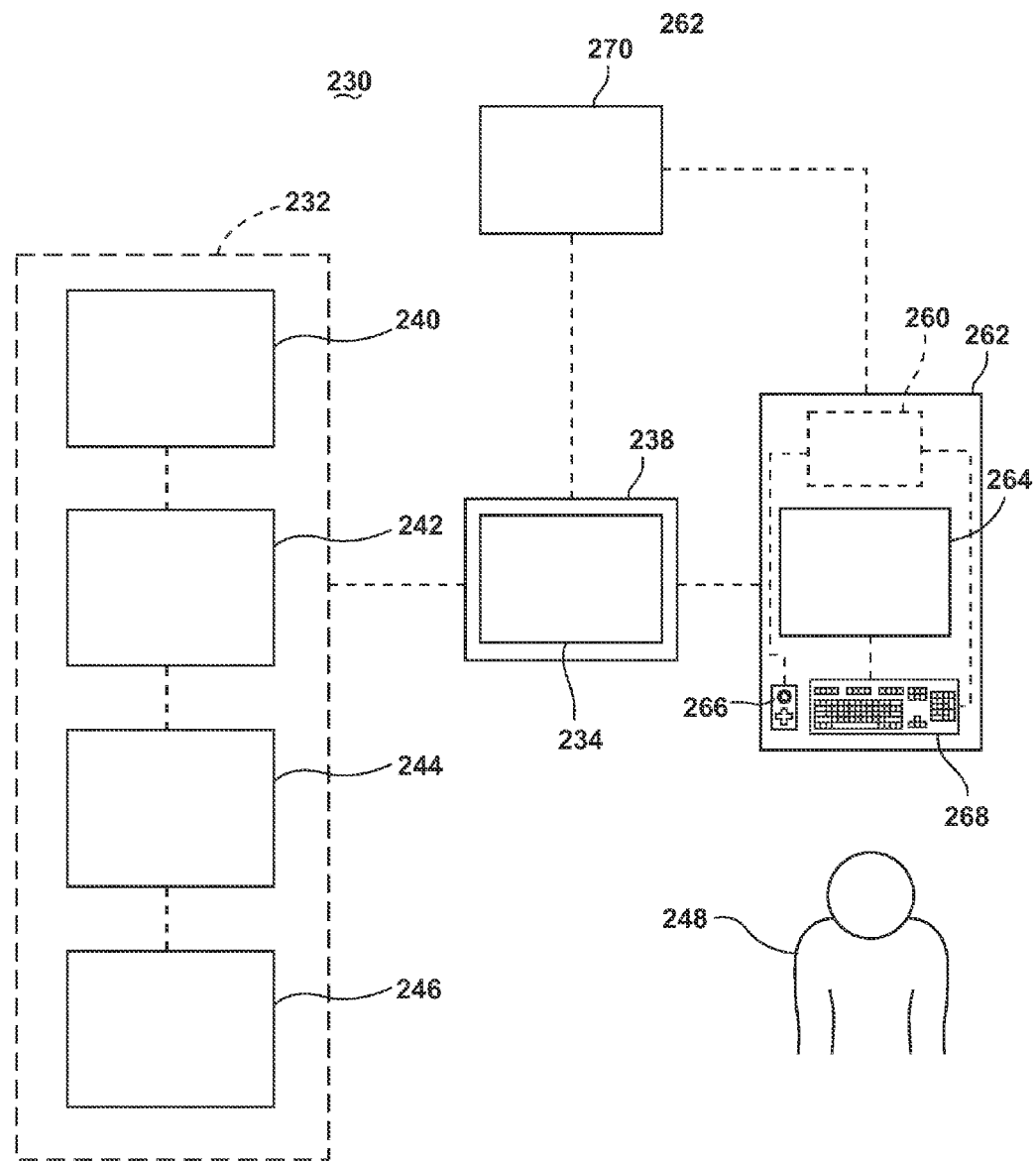
FIG. 4 is a schematic view of an airline operations control system according to yet another embodiment of the invention.

FIG. 4 illustrates an alternative airline operations control system 230 capable of self-learning according to a third embodiment of the invention. The third embodiment is similar to the first embodiment; therefore, like parts will be identified with like numerals increased by 200, with it being understood that the description of the like parts of the first embodiment applies to the third embodiment, unless otherwise noted.

One difference is that the display module has been replaced by a learning module 260. Like the display module, the learning module 260 may be executed on a computer 262 configured to access the stable operations outputted by the query module 234. The learning module 260 may have a display 264 capable of presenting at least a subset of the stable operating solutions to airline operation personnel 248 for selection. The display 264 may be any suitable display for displaying the stable operating solutions to the airline operations personnel 248 including but not limited to a video display. Although the display 264 has been illustrated and described as being included within the computer 262, it is contemplated that the display may be a separate device operably coupled to the learning module 260.

The learning module 260 may also have or be operably coupled to one or more cursor control devices 266 and one or more multifunction keyboards 268, which the airline operation personnel 248 may use to interact with the learning module 260 and the display 264. A suitable cursor control device 266 may include any device suitable to accept input from the airline operation personnel 248 and to convert that input to a graphical position on the display of the learning module 260. Various joysticks, multi-way rocker switches, mice, trackballs, and the like are suitable for this purpose.

It is contemplated that a cost module 270 may be included in the airline operations control system 230 and may be operably coupled to both the query module 234 and the learning module 260. The cost module 270 may be executed on a computer (not shown) configured to access the stable operations and/or a subset of stable operations. This may be done through access of either the query module 234 or the learning module 260. The cost module 270 may be configured to calculate a cost for each of the stable operating solutions. The cost module 270 may also have the ability to track activities related to unscheduled failures and decisions made by the aircraft operations personnel 248.

The third embodiment of the airline operations control system 230 may operate similarly to the first embodiment described above in that it may provide a subset of stable solutions to aircraft operations personnel 248 for use in determining a response to a failure. The query module 234 may also operate similarly to the second embodiment in that it may iterate over the database by varying at least one of the following input variables: immediately repair the failure, delay the repair, delay the flight, cancel the flight, and swap the aircraft. Like the second embodiment, the query module 234 may execute a separate thread for each of the aircraft. Furthermore, the query module 234 may be continuously executed until completion of the routes.

However, it is contemplated that during operation the airline operations control system 230 may request input from the aircraft operations personnel 248 related to the stable solutions. For example, when the stable solutions are displayed to the aircraft operations personnel 248 on the display 264 that the airline operations control system 230 may request that the aircraft operations personnel 248 make a ranking input of the displayed stable solutions. The ranking input may include at least one of a preferred ranking and a best ranking of the aircraft operations personnel 248. It is contemplated that the airline operations control system 230 may also request a selection input from the aircraft operations personnel 248 regarding which of the solutions was selected for implementation. It is contemplated that the selection of the subset of stable solutions for output may be based on rankings and selections made previously by the aircraft operations personnel 248. It is also contemplated that the learning module 260 may request input in the form of question and answer feedback and that the subset of stable solutions for output may be based on such feedback. For example, aircraft operation personnel 248 may select what the airline operations control system 230 deems a less than optimal selection and may request that the aircraft operations personnel 248 provide information related to the selection.

The learning module 260 may learn the selection preferences of the aircraft operations personnel 248 over time and may control future selection of the presented subset of the stable operating solutions based on the learning. In this manner an embodiment of the airline operations control system 230 may be self-learning and may include example based evidentiary reasoning that may capture the knowledge of the aircraft operations personnel 248 in a way that the airline operations control system 230 can build and learn from this decision modality.

The learning module 260 may be capable of learning in a variety of ways including a combination of the choices selected by the aircraft operations personnel 248 and the results of these and comparisons with the analysis results of other stable solutions. For example, the learning module 260 may be capable of storing the displayed stable solutions and the resulting selection of the aircraft operations personnel 248 and from this tune the priorities for costing decisions and other parameters to ensure that the prioritization on the recommended stable solutions reflects the real priorities of the aircraft operations personnel 248. The learning module 260 may also include an off-line analysis feature where the selections of the aircraft operations personnel 248 are replayed for an independent analyst to rate to ensure that only good user decisions are used for tuning. The learning module may also store the results of the implemented actions and the "what-ifs" of the other available actions in light of all the actual situations that developed and such a complete retrospective analysis may be used to tune future decisions.

The learning module 260 may also be configured to access the cost calculated by the cost module 270 and may select the subset of stable operating solutions to be displayed based on the learned selection preference and the cost. The learning module 260 may present the subset of stable solutions by displaying them on the video display 264 in ranked order according to at least one of learned selection preference and cost. Such a ranked order may include a weighting of the learned selection preference and cost. The cost module 270 may include a cost calculation for solution execution based on initial conditions, a cost calculation for actual solution executed, and a cost calculation for an optimized solution such that the learning module 260 may learn from such costing and tailor output stable solutions thereon.

A technical effect is that the operations control system 230 will be capable of self-learning and improve the displayed stable solutions over time. By learning from the actions of the aircraft operations personnel 248 and continual self-analysis the operations control system 230 may provide decisions tailored for the aircraft operations personnel 248. It is contemplated that such a system may help with greater user acceptance by the aircraft operations personnel 248. Further the operations control system 230 may continue to adapt to the changing priorities of the airline. In this manner, the operations control system 230 provides a tailored system for a given airline that continues to improve.

The above embodiments provide a variety of benefits including that airline personnel in an AOC are provided with recommended actions including maintenance and/or dispatch when an aircraft experiences a maintenance issue or when a maintenance issue is predicted. In this manner the airline personnel in the AOC may be supported in a manner that takes into account a combination of all data including improved knowledge of the state of the aircraft and simulates the airline to understand the options and accurately costs these to generate a recommendation. A commercial advantage is realized in that the airline is saved expense by removing inefficiency and waste due to poor decision making. The above embodiments may minimize the time aircraft are grounded, may minimize delays, and may eliminate or minimize cancelations for an entire airline.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airline operations control system for an airline having multiple aircraft and multiple routes formed by one or more flights, which are implemented by the aircraft flying the flights forming the routes, the system comprising:
   a query module configured to determine at least one predicted failure of the at least one aircraft flying one of the routes;
   a computer searchable database comprising:

aircraft inventory data including a unique identifier for each of the multiple aircraft;

aircraft status data, including maintenance for a predicted failure, for each of the multiple aircraft in the aircraft inventory data;

route data including each flight on a route, a destination for each flight, and the aircraft designated to fly each flight; and maintenance resources including maintenance resources related to repairing the predicted failure of the at least one aircraft, for each of the destinations; and a display module configured to display at least a subset of stable solutions to an aircraft operations personnel for use in determining a response to the predicted failure;

wherein the query module is configured to query the database for and output stable operating solutions that ensure completion of the multiple routes based on the predicted failure of the at least one aircraft flying one of the routes and wherein the query module is executed on a computer configured to access the database and determine the stable solutions by permutating over the database an airline operation algorithm that simulates the execution of each of the multiple routes to completion and varying for each permutation at least one of a group of inputs including repairing the predicted failure.

2. The airline operations control system of claim 1 wherein the database further comprises prognostic aircraft health data for the predicted failure.

3. The airline operations control system of claim 2 wherein the query module ranks the stable solutions based on at least one of airline personnel preference and cost.

4. The airline operations control system of claim 3 wherein the query module outputs a subset of the stable solutions based on the ranking.

5. The airline operations control system of claim 1 wherein the aircraft status data comprises at least one of: fully healthy, grounded, time-limited dispatch, and limited dispatch.

6. A method of controlling operation of an airline having multiple aircraft and multiple routes, the method comprising:

determining a predicted failure in one of the aircraft designated for a flight;

providing on a computer system, a computer searchable database comprising:

aircraft inventory data including a unique identifier for each of the multiple aircraft;

aircraft status data, including a maintenance for a predicted failure, for each of the multiple aircraft in the aircraft inventory data;

route data including each flight on a route, a destination for each flight, and the aircraft designated to fly each flight; and maintenance resources including maintenance resources related to repairing the predicted failure, for each of the destinations;

determining, using the computer system, stable solutions of operation of the airline by permutating over the database an airline operation algorithm that simulates execution of each of the multiple routes to completion and varying for each permutation at least one of repairing the predicted failure; and displaying at least a subset of the stable solutions to an aircraft operations personnel for use in determining a response to the predicted failure.

7. The method of claim 6 wherein the database further comprises prognostic aircraft health data for the predicted failure and determining stable solutions of operation incorporates the prognostic aircraft health data in the airline operation algorithm.

8. The method of claim 7, further comprising requesting a ranking input from the aircraft operations personnel.

9. The method of claim 8 wherein the ranking input comprises at least one of a preferred ranking and a best ranking.

10. The method of claim 8, further comprising requesting a selection input from the aircraft operations personnel regarding which of the solutions was selected for implementation.

11. The method of claim 10 wherein the displaying at least the subset of the stable solutions comprises selecting the subset based on ranking and selection.

12. The method of claim 6 wherein the aircraft status data comprises at least one of: fully healthy, grounded, time-limited dispatch, and limited dispatch.

13. The method of claim 12 wherein when the aircraft status data comprises grounded, delaying the repair is removed as a variable input to the airline operation algorithm.

14. The method of claim 12 wherein when the aircraft status data comprises time-limited dispatch, delaying the repair is maintained as a variable input to the airline operation algorithm until the time limit is met.

15. The method of claim 6 wherein the maintenance resources further comprise traveling maintenance resources.

16. The method of claim 6 wherein the at least the subset of stable solutions displayed is selected based on at least one of the following constraints: cost, no canceled flights, reliability, customer satisfaction, and that all passengers reach their destinations on the day planned.

17. The method of claim 16 wherein the no canceled flight constraint and all passengers reaching their destination on the day planned constraint are limited to one of a holiday and the day before the holiday.

18. The method of claim 16 wherein customer satisfaction is determined based on at least one of fewest cancelled flights, fewest passengers not arriving at their final destination on the day planned, fewest passengers delayed more than 15 minutes, total flight delays, total passenger delays, and post-flight customer satisfaction surveys.

19. The method of claim 16 wherein the cost is determined based on at least one of a predetermined value for cost per minute of delay, cost per cancellation, cost per minute that an aircraft is out of service, cost per swap.

* * * * *

UNITED STATES PATENT AND TRADEMARK OFFICE
CERTIFICATE OF CORRECTION

| | | |
|---|---|---|
| PATENT NO. | : 8,798,899 B2 | Page 1 of 1 |
| APPLICATION NO. | : 13/411991 | |
| DATED | : August 5, 2014 | |
| INVENTOR(S) | : James Kenneth Aragones et al. | |

It is certified that error appears in the above-identified patent and that said Letters Patent is hereby corrected as shown below:

Title Page, item [73] Assignee: "General Electric Company, Schenectady, NY (US)" should be -- GE Aviation Systems Limited, Bishops Cleeve, Cheltenham (UK) --

Signed and Sealed this
Seventeenth Day of March, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,798,899 B2 | Page 1 of 1 |
| APPLICATION NO. | : 13/411991 | |
| DATED | : August 5, 2014 | |
| INVENTOR(S) | : Aragones et al. | |

It is certified that error appears in the above-identified patent and that said Letters Patent is hereby corrected as shown below:

On the Title Page, item (30), under "Foreign Application Priority Data",
in Column 1, Line 1, delete "1120309.8" and insert -- 11203098 --, therefor.

In the specification

In Column 7, Line 19, delete "query module 130" and insert -- query module 134 --, therefor.

In the claims

In Column 12, Line 36, in Claim 16, delete "the at least" and insert -- at least --, therefor.

In Column 12, Line 36, in Claim 16, delete "subset of" and insert -- subset of the --, therefor.

Signed and Sealed this
Thirteenth Day of October, 2015

Michelle K. Lee
*Director of the United States Patent and Trademark Office*